United States Patent
Makal

(10) Patent No.: US 10,184,023 B2
(45) Date of Patent: Jan. 22, 2019

(54) THERMOPLASTIC POLYURETHANE WITH HIGH HEAT RESISTANCE

(71) Applicant: Lubrizol Advanced Materials, Inc., Cleveland, OH (US)

(72) Inventor: Umit G. Makal, Stow, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 15/329,767

(22) PCT Filed: Aug. 11, 2015

(86) PCT No.: PCT/US2015/044551
§ 371 (c)(1),
(2) Date: Jan. 27, 2017

(87) PCT Pub. No.: WO2016/025421
PCT Pub. Date: Feb. 18, 2016

(65) Prior Publication Data
US 2017/0210846 A1    Jul. 27, 2017

Related U.S. Application Data

(60) Provisional application No. 62/035,543, filed on Aug. 11, 2014.

(51) Int. Cl.
| | | |
|---|---|---|
| *C08G 18/76* | (2006.01) | |
| *C08G 18/32* | (2006.01) | |
| *C08G 18/44* | (2006.01) | |
| *C08G 18/48* | (2006.01) | |
| *C09J 175/08* | (2006.01) | |

(52) U.S. Cl.
CPC ............. *C08G 18/76* (2013.01); *C08G 18/32* (2013.01); *C08G 18/3218* (2013.01); *C08G 18/44* (2013.01); *C08G 18/4825* (2013.01); *C08G 18/7657* (2013.01); *C09J 175/08* (2013.01)

(58) Field of Classification Search
CPC .................. C08G 18/3218; C08G 18/6505
See application file for complete search history.

(56) References Cited

U.S. PATENT DOCUMENTS

| | | | |
|---|---|---|---|
| 2,945,008 A * | 7/1960 | Caldwell | C08G 18/3218 521/174 |
| 4,587,352 A * | 5/1986 | Masaoka | C08F 299/065 526/266 |
| 5,436,399 A * | 7/1995 | Koyama | C08G 18/10 428/423.1 |
| 5,494,990 A * | 2/1996 | Tagawa | C08G 18/10 528/73 |
| 5,770,674 A * | 6/1998 | Cageao | C08G 18/2805 156/107 |
| 6,608,167 B1 * | 8/2003 | Hayes | C07D 493/04 525/437 |
| 2003/0092832 A1 * | 5/2003 | Tanaka | C08G 18/12 524/589 |
| 2012/0252958 A1 * | 10/2012 | Yagi | C08G 18/0823 524/507 |

FOREIGN PATENT DOCUMENTS

| | | | | |
|---|---|---|---|---|
| JP | 11043662 A | * | 2/1999 | ........... C08G 18/755 |
| JP | 2004059706 A | * | 2/2004 | |

OTHER PUBLICATIONS

Machine Translation of JP 11-043662 (Year: 2018).*
Machine Translation of JP 2004059706 A (Year: 2004).*

* cited by examiner

*Primary Examiner* — Michael M Dollinger
(74) *Attorney, Agent, or Firm* — Eryn Ace Fuhrer; Teresan W. Gilbert

(57) ABSTRACT

The present invention relates to novel thermoplastic polyurethane (TPU) compositions that contain alkylene substituted spirocyclic compounds as chain extender and polycarbonate polyol. The present invention provides for TPUs which exhibit high temperature resistance.

10 Claims, No Drawings

THERMOPLASTIC POLYURETHANE WITH HIGH HEAT RESISTANCE

CROSS REFERENCE TO RELATED APPLICATION

This application claims priority from PCT Application Serial No. PCT/US2015/044551 filed on Aug. 11, 2015, which claims the benefit of U.S. Provisional Application No. 62/035,543 filed on Aug. 11, 2014, the entirety of both of which is hereby incorporated by reference.

FIELD OF THE INVENTION

The present invention relates to thermoplastic polyurethane (TPU) compositions which can be used in articles that require a high heat resistance, such as hoses, tubes, wires or cables.

BACKGROUND OF THE INVENTION

The use of polyurethanes, including thermoplastic polyurethanes (TPU) in transfer elements, such as tubes or hoses, or coating cable systems is known in the prior art. TPUs offer a variety of benefits that extend the durability and service life of transfer elements and cable systems. This is due to outstanding abrasion resistance, high mechanical properties, high impact resistance, low temperature flexibility, good chemical resistance, high cut and tear resistance, and good environmental weathering. The state of the art shows several needs for TPUs when used in transfer elements and cable systems. Some of these needs include for example, the desire for transfer elements or cable systems used under extremely hot environmental or working conditions, such as for example meeting the high temperature requirements for Class D type cables (ISO 6722) or cables with heat ratings of 125° C. or higher (UL1581). Thus, there is a general need in the state of the art for TPU compositions that can used in systems exhibiting high temperature resistance, while maintaining other physical properties like tensile strength and elongation, for example.

SUMMARY OF THE INVENTION

The present invention provides a thermoplastic polyurethane (TPU) which comprises the reaction product of (1) a polyisocyanate, (2) an alkylene substituted spirocyclic compound comprising an alkylene substituted saturated spirocyclic-diol, an alkylene substituted saturated spirocyclic-diamine, or a combination thereof, and (3) a polycarbonate polyol and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

The present invention further provides a thermoplastic polyurethane (TPU) which comprises the reaction product of (1) a polyisocyanate, (2) an alkylene substituted spirocyclic compound comprising an alkylene substituted saturated spirocyclic-diol, an alkylene substituted saturated spirocyclic-diamine, or a combination thereof, (3) a polycarbonate polyol, and (4) an additional chain extender and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

The present invention further discloses a process of making the TPUs, comprising the steps of: (a) reacting (1) a polyisocyanate, (2) an alkylene substituted spirocyclic compound comprising an alkylene substituted saturated spirocyclic-diol, an alkylene substituted saturated spirocyclic-diamine, or a combination thereof, and (3) a polycarbonate polyol and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine; (b) extruding the thermoplastic polyurethane composition into a hot extruded tube; and (c) cooling the hot extruded tube to below the melting point of the thermoplastic polyurethane composition to produce an extruded thermoplastic polyurethane.

The present invention further discloses an article which comprises the described TPU.

The invention also provides a hose or a tube comprising the disclosed TPU.

The invention further describes a cable or a wire coated with the disclosed TPU.

The invention further discloses a method of increase the heat resistance of an article, where the article comprises an effective amount of a TPU wherein the TPU comprises the reaction product of (1) a polyisocyanate, (2) an alkylene substituted spirocyclic compound comprising an alkylene substituted saturated spirocyclic-diol, an alkylene substituted saturated spirocyclic-diamine, or a combination thereof, and (3) a polycarbonate polyol and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

DETAILED DESCRIPTION OF THE INVENTION

The process to make the thermoplastic polyurethane (TPU) of this invention includes a reaction with an alkylene substituted spirocyclic compound. The obtained TPU exhibits a significant increase in the heat resistance. In one aspect, the TPU of the present invention includes the reaction product of (1) a polyisocyanate, (2) an alkylene substituted spirocyclic compound comprising an alkylene substituted saturated spirocyclic-diol, an alkylene substituted saturated spirocyclic-diamine, or a combination thereof, and (3) a polycarbonate polyol and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine. The technique under which these reactants are polymerized to synthesize the TPU may be conducted utilizing conventional processing equipment, catalysts, and processes. However, the polymerization is conducted in a manner that will result in the desired polymer characteristics or properties. The types and levels of polyisocyanate, polycarbonate polyol and alkylene substituted spirocyclic compound comprising an alkylene substituted saturated spirocyclic-diol, an alkylene substituted saturated spirocyclic-diamine, or a combination thereof will be adjusted to attain the desired set of chemical and physical characteristics for the polymer being synthesized. The polymerization techniques useful in making the TPUs of this invention include conventional methods, such as reactive extrusion, batch processing, solution polymerization, and cast polymerization.

In one embodiment, the polyisocyanate used in synthesizing the thermoplastic polyurethane can be selected from a diisocyanate. While aliphatic diisocyanates can be utilized, aromatic diisocyanates are typically used in making polymers for most applications. In some embodiments, the polyisocyanate component is essentially free of, or even completely free of aliphatic diisocyanates. Moreover, the use of multifunctional isocyanate compounds, i.e., triisocyanates, etc., which cause undesirable premature crosslinking, are generally avoided and thus the amount used, if any, is generally less than 4 mole percent in one aspect, and less than 2 mole percent in another aspect, based upon the total moles of all of the various isocyanates used.

Suitable diisocyanates include aromatic diisocyanates such as: 4,4'-methylenebis(phenyl isocyanate) (MDI); m-xylylene diisocyanate (XDI), phenylene-1,4-diisocyanate, naphthalene-1,5-diisocyanate, diphenylmethane-3,3'-dimethoxy-4,4'-diisocyanate, and toluene diisocyanate (TDI); as well as aliphatic diisocyanates such as isophorone diisocyanate (IPDI), 1,4-cyclohexyl diisocyanate (CHDI), decane-1,10-diisocyanate, lysine diisocyanate (LDI), 1,4-butane diisocyanate (BDI), isophorone diisocyanate (PDI), 3,3-Dimethyl-4,4-biphenylene diisocyanate (TODI), 1,5-naphthalene diisocyanate (NDI), and dicyclohexylmethane-4,4'-diisocyanate (H12MDI). Mixtures of two or more polyisocyanates may be used. In some embodiments, the polyisocyanate is MDI and/or H12MDI. In some embodiments, the polyisocyanate includes MDI. In some embodiments, the polyisocyanate may include H12MDI. In some embodiments, the polyisocyanate component of the invention is essentially free of, or even completely free of, hexamethylene diisocyanate (HDI). Dimers and trimers of the above diisocyanates may also be used as well as a blend of two or more diisocyanates may be used.

The polyisocyanate used in this invention may be in the form of a low molecular weight polymer or oligomer which is end capped with an isocyanate. For example, the alkylene substituted spirocyclic compound disclosed above may be reacted with an isocyanate-containing compound to create a low molecular weight polymer end capped with isocyanate. In the TPU art, such materials are normally referred to as pre-polymers. Such pre-polymers normally have a number average molecular weight (Mn) which is within the range of about 500 to about 10,000.

The mole ratio of the one or more diisocyanates is generally from about 0.95 to about 1.05 in one aspect, and from about 0.98 to about 1.03 moles per mole in another aspect, of the total moles of the alkylene substituted spirocyclic compound.

In one embodiment, the alkylene substituted spirocyclic compound comprises an alkylene substituted saturated spirocyclic-diol, an alkylene substituted saturated spirocyclic-diamine, or a combination thereof and each ring is substituted with an alkylene group that contains from 1 to 4 carbon atoms, terminated by a hydroxy group or an amine where the amine is a primary or secondary amine. In one embodiment, the alkylene substituted spirocyclic compound is a spiroheterocycle containing 2 heteroatoms in each ring, and the heteroatoms are oxygen, nitrogen, sulfur or phosphorous. In one embodiment, the alkylene substituted spirocyclic compound is a spiroheterocycle containing 2 heteroatoms in each ring and the heteroatoms are oxygen or nitrogen. In one embodiment, the alkylene substituted spirocyclic compound is a spiroheterocycle containing 2 heteroatoms in each ring and the heteroatoms are oxygen.

In one embodiment, the alkylene substituted spirocyclic compound shows a structural formula:

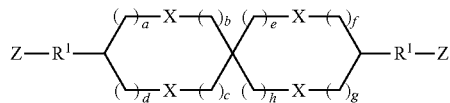

wherein each X is independently selected from O, $CHR^2$, $NR^2$, S, $PR^2$, wherein each $R^2$ represents a hydrogen atom or an alkyl group containing from 1 to about 6 carbon atoms, each $R^1$ is an alkylene containing from 1 to 4 carbon atoms and each Z is selected from —OH or —$NHR^3$ wherein $R^3$ represents a hydrogen atom or an alkyl group containing from 1 to about 6 carbon atoms, wherein a, b, c, d, e, f, g and h are each independently an integer from 0 to 2 so long as the sum of a, b, c, and d is from 1 to 3, and the sum of e, f, g and h is from 1 to 3. In one embodiment, a is equal to g, b is equal to h, c is equal to e and d is equal to f. In one embodiment, all X are identical. In one embodiment, all X are identically selected from O or $NR^2$, wherein $R^2$ represents a hydrogen atom or an alkyl group containing from 1 to about 6 carbon atoms, a is equal to g, b is equal to h, c is equal to e and d is equal to f. In one embodiment, the spirocyclic-dialkylene compound contains two 6-membered ring, X is independently selected from O or $NR^2$, wherein $R^2$ represents a hydrogen atom or an alkyl group containing from 1 to about 6 carbon atoms, $R^1$ is an alkylene containing from 1 to 4 carbon atoms, Z is —OH or $NH_2$, and either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0. In one embodiment, the spirocyclic-dialkylene compound contains two 6-membered ring, X is identically selected from O or $NR^2$, wherein $R^2$ represents a hydrogen atom or an alkyl group containing from 1 to about 6 carbon atoms, $R^1$ is an alkylene containing from 1 to 4 carbon atoms, Z is —OH or $NH_2$, and either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0 In one embodiment, the spirocyclic-dialkylene compound contains two 6-membered ring, X is O, $R^1$ is 1,1-dimethylethyl, Z is —OH, and either (i) a is 0, b is 1, c is 1, d is 0, e is 1, f is 0, g is 0 and h is 1 or (ii) a is 1, b is 0, c is 0, d is 1, e is 0, f is 1, g is 1 and h is 0.

In one embodiment, the alkylene substituted spirocyclic compound shows a structural formula:

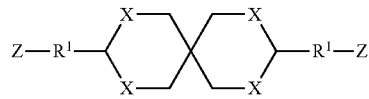

wherein each X is independently selected from O, $CHR^2$, $NR^2$, S, $PR^2$, wherein each $R^2$ represents a hydrogen atom or an alkyl group containing from 1 to about 6 carbon atoms, each $R^1$ is an alkylene containing from 1 to 4 carbon atoms and each Z is selected from —OH or —$NHR^3$ wherein $R^3$ represents a hydrogen atom or an alkyl group containing from 1 to about 6 carbon atoms. In one embodiment, X is identically selected from O, $CHR^2$, $NR^2$, S, $PR^2$, wherein each $R^2$ represents a hydrogen atom or an alkyl group containing from 1 to about 6 carbon atoms. In one embodiment, X is O, $R^1$ is 1,1-dimethylethyl, and Z is —OH.

In one embodiment, the polycarbonate polyol is a polycarbonate polyol or a copolymeric polycarbonate polyol or mixtures of polycarbonate polyols and/or copolymeric polycarbonate polyols. In one embodiment, the copolymeric polycarbonate polyol is a copolymer of polycarbonate polyol and a polyol selected from polyether polyol, polyester polyol, polycaprolactone polyol or polyamide polyol and it contains at least 50%, at least 60%, at least 70%, or at least 80% of polycarbonate polyol. In other embodiments, the polycarbonate polyol is substantially free, or even completely free of copolymeric polycarbonate polyol.

In one embodiment, the polycarbonate polyol or the polycarbonate polyol in the copolymeric polycarbonate polyol is the reaction product of at least one carbonate and a glycol. U.S. Pat. No. 4,131,731 is hereby incorporated by reference for its disclosure of polycarbonate polyols and their preparation. Such polycarbonates are linear and have terminal hydroxyl groups with essential exclusion of other terminal groups. The essential reactants are glycols and carbonates. Suitable glycols are cycloaliphatic or aliphatic diols, and suitable carbonates are alkylene carbonates. Suitable cycloaliphatic or aliphatic diols are selected from cycloaliphatic and aliphatic diols containing 4 to 40, and or even 4 to 12 carbon atoms, and from polyoxyalkylene glycols containing 2 to 20 alkoxy groups per molecular with each alkoxy group containing 2 to 4 carbon atoms. Diols suitable for use in the present invention include aliphatic diols containing 4 to 12 carbon atoms such as butanediol-1,4, pentanediol-1,5, neopentyl glycol, hexanediol-1,6, 2,2,4-trimethylhexanediol-1,6, decanediol-1,10, hydrogenated dilinoleylglycol, hydrogenated dioleylglycol; and cycloaliphatic diols such as cyclohexanediol-1,3, dimethylolcyclohexane-1,4, cyclohexanediol-1,4, dimethylolcyclohexane-1,3, 1,4-endomethylene-2-hydroxy-5-hydroxymethyl cyclohexane, and polyalkylene glycols. The diols used in the reaction may be a single diol or a mixture of diols depending on the properties desired in the finished product. Polycarbonate intermediates which are hydroxyl terminated are generally those known to the art and in the literature. Suitable alkylene carbonates are selected from alkylene carbonates composed of a 5 to 7 member ring. Suitable carbonates for use herein include ethylene carbonate, trimethylene carbonate, tetramethylene carbonate, pentamethylene carbonate, hexamethylene carbonate, heptamethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate. Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Examples of suitable diarylcarbonates, which can contain 6 to 20 carbon atoms in each aryl group, are diphenylcarbonate, ditolylcarbonate, and dinaphthylcarbonate. In other embodiments, the carbonate is essentially free of, or even completely free of, dialkylcarbonates, cycloaliphatic carbonates, and diarylcarbonates. In one embodiment, the polycarbonate polyol is selected from poly(heptamethylenecarbonate) diol, poly(hexamethylenecarbonate) diol, poly(pentamethylenecarbonate)diol, poly(tetramethylenecarbonate)diol, poly(pentamethylene-co-hexamethylenecarbonate)diol or poly(tetramethylene-co-hexamethylenecarbonate)diol or combinations thereof Suitable polyether polyols in the copolymeric polycarbonate polyol include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethylene ether glycol) comprising water reacted with tetrahydrofuran which can also be described as polymerized tetrahydrofuran, and which is commonly referred to as PTMEG. In some embodiments, the polyether polyol in the copolymeric polycarbonate polyol is polyethylene glycol (PEG). Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. The various polyether polyols generally have a number average molecular weight (Mn) as determined by assay of the terminal functional groups which is an average molecular weight greater than about 700, such as from about 700 to about 10,000, from about 1,000 to about 5,000, or from about 1,000 to about 2,500. In some embodiments, the polyether polyol includes a blend of two or more different molecular weight polyethers, such as a blend of 1,000 Mn and 1,450 Mn PEG.

Suitable polyester polyols in the copolymeric polycarbonate polyol include polyester polyols produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. In some embodiments, the polyester polyol is a linear polyester polyol having a number average molecular weight (Mn) of from about 500 to about 10,000, from about 700 to about 5,000, or from about 700 to about 4,000, and generally have an acid number less than 1.3 or less than 0.5. The molecular weight is determined by assay of the terminal functional groups and is related to the number average molecular weight. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is a preferred acid. The glycols which are reacted to form a desirable polyester intermediate can be aliphatic, aromatic, or combinations thereof, including any of the glycols described above in the chain extender section, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

Suitable polycaprolactone polyols in the copolymeric polycarbonate polyol include one or more polycaprolactone polyols. The polycaprolactone polyols useful in the technology described herein include polyester diols derived from caprolactone monomers. The polycaprolactone polyols are terminated by primary hydroxyl groups. Suitable polycaprolactone polyols may be made from ε-caprolactone and a bifunctional initiator such as diethylene glycol, 1,4-butanediol, or any of the other glycols and/or diols listed herein. Useful examples include CAPA™ 2202A, a 2,000 number average molecular weight (Mn) linear polyester diol, and CAPA™ 2302A, a 3,000 Mn linear polyester diol, both of which are commercially available from Perstorp Polyols Inc. These materials may also be described as polymers of 2-oxepanone and 1,4-butanediol.

The polycaprolactone polyols may be prepared from 2-oxepanone and a diol, where the diol may be 1,4-butanediol, diethylene glycol, monoethylene glycol, 1,6-hexanediol, 2,2-dimethyl-1,3-propanediol, or any combination thereof. In some embodiments, the diol used to prepare the polycaprolactone polyol is linear. In some embodiments, the polycaprolactone polyol is prepared from 1,4-butanediol. In some embodiments, the polycaprolactone polyol has a number average molecular weight from 500 to 10,000, or from 500 to 5,000, or from 1,000 or even 2,000 to 4,000 or even 3,000.

Suitable polyamide polyols in the copolymeric polycarbonate polyol include telechelic polyamide polyols, low molecular weight polyamide oligomers and telechelic polyamides (including copolymers) that include N-alkylated amide groups in the backbone structure. The term polyamide oligomer refers to an oligomer with two or more amide linkages, or sometimes the amount of amide linkages will be specified. In some embodiments, the polyamide oligomer is a species below 20,000 g/mole molecular weight, below 10,000; 5,000; 2,500; or 2,000 g/mole that has two or more amide linkages per oligomer. A subset of polyamide oligomers are telechelic polyamides.

In one embodiment, the polyamide polyol is a telechelic polyamide. Telechelic polyamides are polyamide oligomers with specified percentages of two functional groups of a single chemical type. Ranges for the percent difunctional that are preferred to meet the definition of telechelic are at least 70 or 80. The telechelic polyamide can comprise: (a) two functional end groups selected from hydroxyl, carboxyl, or primary or secondary amine; and (b) a polyamide segment wherein: (i) said polyamide segment comprises at least two amide linkages characterized as being derived from reacting an amine with a carboxyl group; (ii) said polyamide segment comprises repeat units derived from polymerizing two or more monomers selected from the group consisting of lactam monomers, amino carboxylic acids monomers, dicarboxylic acids monomers, and diamine monomers. The telechelic polyamide, in some embodiments, may be characterized as a liquid with a viscosity of less than 100,000 cps at 70° C. as measured by a Brookfield circular disc viscometer with the circular disc spinning at 5 rpm. In some embodiments, the telechelic polyamide is characterized by a weight average molecular weight from about 200 to 10,000 g/mole and comprises a diversity of amide forming repeating units disrupting hydrogen bonding between amide components.

In another aspect, the present invention further relates to a thermoplastic polyurethane (TPU) which comprises the reaction product of (1) a polyisocyanate, (2) an alkylene substituted spirocyclic compound comprising an alkylene substituted saturated spirocyclic-diol, an alkylene substituted saturated spirocyclic-diamine, or a combination thereof, (3) a polycarbonate polyol, and (4) an additional chain extender and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine.

In one embodiment, the additional chain extender is an aliphatic or cycloaliphatic diamine or glycol having from 2 to 20, or 2 to 12, or 2 to 10 carbon atoms, or combinations thereof. Suitable examples include ethylene glycol, diethylene glycol, propylene glycol, dipropylene glycol, 1,3-propanediol, 1,4-butanediol (BDO), 1,6-hexanediol (HDO), 1,3-butanediol, 1,5-pentanediol, neopentylglycol, 1,4-cyclohexanedimethanol (CHDM), hexamethylenediol, heptanediol, nonanediol, dodecanediol, 2-ethyl-1,3-hexanediol, 2,2,4-trimethyl pentane-1,3-diol, 1,4-cyclohexanedimethylol, 3-methyl-1,5-pentanediol, ethylenediamine, butanediamine, hexamethylenediamine, and the like, as well as mixtures thereof. In some embodiments the additional chain extender includes BDO, HDO, 3-methyl-1,5-pentanediol, or a combination thereof. In some embodiments, the additional chain extender includes BDO. Other glycols, such as aromatic glycols or diamines, like for example hydroxyethyl resorcinol (HER) or 2,2-bis[4-(2-hydroxyethoxy)phenyl]propane (HEPP), could be used, but in some embodiments the TPUs described herein are essentially free of or even completely free of such materials.

In another aspect, the present invention further discloses a process of making the TPU, comprising the steps of: (a) reacting (1) a polyisocyanate, (2) an alkylene substituted spirocyclic compound comprising an alkylene substituted saturated spirocyclic-diol, an alkylene substituted saturated spirocyclic-diamine, or a combination thereof, and (3) a polycarbonate polyol and wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a primary or secondary amine; resulting in a TPU composition with high heat resistance; (b) extruding the thermoplastic polyurethane composition into a hot extruded tube; and (c) cooling the hot extruded tube to below the melting point of the thermoplastic polyurethane composition to produce an extruded thermoplastic polyurethane.

Alternatively, in one embodiment, the reaction in step (a) further includes (5) an additional chain extender.

The process to produce the TPU polymer of this invention can utilize conventional TPU manufacturing equipment. The polyisocyanate, the alkylene substituted spirocyclic compound and the polycarbonate polyol disclosed hereinabove are generally added together and reacted in accordance with standard polyurethane synthesis methodology. The TPU forming components of the present invention can be melt polymerized in a suitable mixer, such as an internal mixer known as a Banbury mixer, or in an extruder. In one process, the polyisocyanate is added separately to the extruder. Suitable processing or polymerization starting temperatures of the polyisocyanate are from about 100° C. to about 200° C. in one aspect, and from about 100° C. to about 150° C. in another aspect. Suitable processing or polymerization starting temperatures of the blend of the alkylene substituted spirocyclic compound and the polycarbonate polyol are from about 100° C. to about 220° C. in one aspect, and from about 150° C. to 200° C. in a further aspect. Suitable mixing times in order to enable the various components to react and form the TPU polymers of the present invention are generally from about 2 to about 10 minutes in one aspect, and from about 3 to about 5 minutes in another aspect.

It is often desirable to utilize catalysts such as stannous and other metal carboxylates as well as tertiary amines. Examples of metal carboxylate catalysts include stannous octoate, dibutyltin dilaurate, phenyl mercuric propionate, lead octoate, iron acetylacetonate, magnesium acetylacetonate, and the like. Examples of tertiary amine catalysts include triethyleneamine, and the like. The amount of the one or more catalysts is low, generally from about 50 to about 100 parts by weight per million parts by weight of the end TPU polymer formed.

The weight average molecular weight (Mw) of the TPU polymer of the present invention range from about 60,000 to about 600,000 Daltons in one aspect, from about 100,000 to about 300,000 Daltons in another aspect, and from about 120,000 to about 250,000 Daltons in a further aspect. The Mw of the TPU polymer is measured according to gel permeation chromatography (GPC) against polystyrene standard.

The TPU polymers of the present invention can be mixed with various conventional additives or compounding agents, such as antioxidants, biocides, fungicides, antimicrobial agents, anti-static additives, plasticizers, fillers, extenders, flame retardants, impact modifiers, pigments, lubricants, mold release agents, rheology modifiers, UV absorbers, and the like. The level of conventional additives will depend on the final properties and cost of the desired end-use application, as is well known to those skilled in the art of compounding TPUs. These additional additives can be incorporated into the components of, or into the reaction mixture for the preparation of the TPU, or after making the TPU. In another process, all the materials can be mixed with the TPU and then melted or they can be incorporated directly into the melt of the TPU composition.

In one embodiment, the flame retardants mixed with the TPU polymer of the invention include organic flame retardants comprising a phosphinate compound based on an organic phosphinic salt. Organic phosphinates are a recent addition to the sphere of flame retardants used in engineering thermoplastics. One preferred phosphinate is marketed as the propriety compound Exolit® OP 1311, available from Clariant GmbH, Germany. An organic phosphinate is used in conjunction with other organic flame retardants in an exemplary embodiment of the flame retardant package. The phosphinate compound may be present in an exemplary embodiment of the flame retardant TPU composition in an amount from about 5 to about 40 weight percent, more preferably from about 15 to about 25 weight percent, based on the total weight of the TPU composition.

Other organic flame retardant components include organic phosphates such as triaryl phosphates, and preferably a triphenyl phosphate, and more preferably a proprietary phosphorus based flame retardant, namely NcendX® P-30 from Albermarle Corporation. The organic phosphate may be present in an exemplary embodiment in an amount from about 5 to about 20 weight percent, more preferably from about 5 to about 10 weight percent, based on the total weight of the TPU composition.

Other organic flame retardant components include polyhydric alcohols such as pentaerythritol and dipentaerythritol. The polyhydric alcohol may be present in an exemplary embodiment in an amount from about 0.1 to about 15 weight percent, more preferably from about 2.5 to about 10 weight percent, based on the total weight of the TPU composition. The composition may further include from about 0 to about 10 weight percent of ammonium pentaborate or zinc borate.

In addition, various conventional inorganic flame retardant components may be employed in the flame retardant TPU. Suitable inorganic flame retardants include any of those known to those skilled in the art, such as ammonium phosphate, ammonium polyphosphate, calcium carbonate, antimony oxide, and clay including montmorillonite clay which is often referred to as nano-clay. The inorganic flame retardants may be used at a level of from 0 to about 5 weight percent of the TPU composition.

Thus, in an exemplary embodiment, a flame retardant thermoplastic polyurethane composition comprises at least one thermoplastic polyurethane polymer and a flame retardant package comprising an organic phosphinate compound, an organic phosphate compound, and a polyhydric alcohol. In other exemplary embodiments, inorganic flame retardant fillers may be incorporated into the flame retardant package.

In another aspect, the present invention refers to an article comprising the TPU of the present invention.

In one embodiment, the article is particularly useful as sealing system due to its high temperature resistance, and it may be used as sealing system at the automotive industry. Modern vehicle concepts and structural designs of vehicles have a plurality of cavities which have to be sealed in order to prevent the ingress of moisture and contaminants, since the latter can result in corrosion from the inside on the corresponding body parts. Furthermore, these cavities also transmit airborne sound in the form of unpleasant vehicle running noises and wind noises. These cavities include the upwardly extending A-, B- and C-pillars supporting the roof structure, the roof rail, portions of the fenders, or the sill.

During the assembly of the car, these frame parts and body parts containing cavities are prefabricated from half-shell components which were joined at a later time by welding and/or adhesive bonding so as to form the closed hollow section. With such a type of construction the cavity in the early body in white ("body shop") state of a vehicle body is accordingly easily accessible, so that sealing and acoustically damping baffle parts (sometimes referred to as "pillar fillers" or "cavity filler inserts") can be fixed in this early phase of body construction by mechanical hanging, by insertion into appropriate holding devices, bores or by gluing or welding to the cavity walls.

Most modern baffles or pillar fillers are designed to include a sealing material disposed on a support member or carrier in the vehicle. The carrier is generally manufactured from a rigid material, such as hard plastic, such that its shape approximates the shape of the cavity to be sealed. In one embodiment, the sealing system of the invention is activated (thermally or chemically) to expand (or "foam") after insertion into the cavity so that the sealing system forms a seal with the walls of the cavity. Thus, the expanded sealing system creates an airtight seal between the carrier and the walls of the cavity.

In another aspect, the present invention refers to a transfer element comprising the TPU of the present invention. The disclosed technology solves the problem of application of TPU to end articles, like transfer elements, where a high heat resistance is required. Useful transfer elements include hoses, tubes, pipes and such, including liners and/or jackets thereof. In one embodiment, the high temperature resistant hose is a fire hose, industrial hose, oil hose. In some embodiments, the articles of the invention are fire hoses that include a liner made from the TPUs described herein. In some embodiments the liner is a layer applied to the inner jacket of the fire hose.

In another aspect, the present invention refers to a cable system coated with the TPU of the present invention. In one embodiment, the TPU of the invention coates electric wires and cables. Due to the good mechanical and physical properties of TPUs, and particularly, the high heat resistance of the TPU of the invention, cables or wires coated with the TPU of the invention may be used in mining and electrical power generation, which may be off-shore, solar based, wind turbine, or hydroelectric. In other embodiment, cables or wires coated with the TPU of the invention might be used in construction where they are used in security, data, terminals, communication, and signal wiring. In other embodiment, cables or wires coated with the TPU of the invention might be used in automotive, trains, subways, boats, and aviation industries.

In another aspect, the present invention refers to fire retardant and thermal insulating fabrics containing the TPU of the invention. In one embodiment, the fire retardant and thermal insulating fabric includes for example clothing, boot and shoe liners, fire protection blankets or garments. These fabrics can be used to produce garments well suited for being worn by those in the military or garments worn by firefighters and other security personnel, and garments worn in industrial settings. These garments may include shirts, pants, bib overalls, socks and other leg wear, gloves, scarves, hats, helmets, face shields, vests, chaps, jackects, coats, aprons, waders, boots, shoes, and the like.

In still other embodiments, the articles containing the various composition described above include any article that will be exposed to high temperatures during its use, and especially such articles which have not been made using thermoplastic polyurethanes in the past because of such materials having insufficient high temperature resistance or performance.

In another aspect, the present invention refers to a method of increase the heat resistance of an article, where the article comprises an effective amount of a thermoplastic polyurethane (TPU) wherein the TPU comprises the reaction product of (1) a polyisocyanate, (2) an alkylene substituted spirocyclic compound comprising an alkylene substituted saturated spirocyclic-diol, an alkylene substituted saturated spirocyclic-diamine, or a combination thereof, and (3) a polycarbonate polyol, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a a primary or secondary amine. This method includes the step of of using(1) a polyisocyanate, (2) an alkylene substituted spirocyclic compound comprising an alkylene substituted saturated spirocyclic-diol, an alkylene substituted saturated spirocyclic-diamine, or a combination thereof, and (3) a polycarbonate polyol, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a a primary or secondary amine in the preparation of a TPU. Any of the TPU materials described above may be used in these methods.

The present technology also includes the use of a thermoplastic polyurethane (TPU) wherein the TPU comprises the reaction product of (1) a polyisocyanate, (2) an alkylene substituted spirocyclic compound comprising an alkylene substituted saturated spirocyclic-diol, an alkylene substituted saturated spirocyclic-diamine, or a combination thereof, and (3) a polycarbonate polyol, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a a primary or secondary amine to increase the heat resistance of an article. These uses include using (1) a polyisocyanate, (2) an alkylene substituted spirocyclic compound comprising an alkylene substituted saturated spirocyclic-diol, an alkylene substituted saturated spirocyclic-diamine, or a combination thereof, and (3) a polycarbonate polyol, wherein the alkylene substituted spirocyclic compound contains two rings containing from 5 to 7 atoms per ring, and where each ring is substituted with an alkylene group that contains from 1 to 4 carbon atoms, terminated by a hydroxy group or an amine where the amine is a a primary or secondary amine in the preparation of a TPU. Any of the TPU materials described above may be used in these uses.

Various preferred features and embodiments will be described below by way of non-limiting illustration.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about". It is to be understood that the upper and lower amount, range, and ratio limits set forth herein may be independently combined. Similarly, the ranges and amounts for each element of the invention can be used together with ranges or amounts for any of the other elements.

EXAMPLES

Examples 1-2

In these examples, the TPUs are synthesized from the components set forth in Table 1. The hardness for all formulations are kept in the 87-90 Shore A range in order to make them comparable. Example 1 and 2 are the comparative examples. Example 1 is based on a polycarbonate polyol soft segment and a short diol, BDO, chain extender. Example 2 uses polyether polyol and the alkylene substituted spirocyclic compound PSG as chain extender. The inventive example is based on polycarbonate polyol and the alkylene substituted spirocyclic compound PSG as chain extender. Other aromatic polyisocyanates, polycarbonate polyols and alkylene substituted spirocyclic compounds as chain extenders disclosed in the description could also be used in the preparation of these examples. It is shown that the inventive example exhibits superior heat resistance.

Comparative example 1 fails during the 200° C/6 hours heat aging part of the ISO 6722 Type D cable testing. Comparative example 2 fails during both the 180° C./7 days heat aging (UL1581) and 175° C/10 days heat aging (ISO 6722). The inventive example significantly performed well during all short term heat aging conditions, showing a better performance than the comparative examples (Table 4).

TABLE 4

|  | Original | | 158 C./7 Days | | 175 C./10 Days | | 180 C./7 Days | | 200 C./6 Hrs | | |
| --- | --- | --- | --- | --- | --- | --- | --- | --- | --- | --- | --- |
|  | Ten. Str. (MPa) | Elongation (%) | Ten. Str. (MPa) | Elongation (%) | Ten. Str. (MPa) | Elongation (%) | Ten. Str. (MPa) | Elongation (%) | Ten. Str. (MPa) | Elongation (%) | % Sag |
| Comp. Example 1 | 44 | 374 | NT | NT | 20 | 138 | NT | NT | M | M | N/A |
| % Retention |  |  | N/A | N/A | 45.5 | 36.9 | N/A | N/A | N/A | N/A |  |
| Comp. Example 2 | 27 | 526 | NT | NT | TBTT | TBTT | TBTT | TBTT | NT | NT | N/A |
| % Retention |  |  | N/A | N/A | N/A | N/A | N/A | N/A | N/A | N/A |  |
| Inventive Example | 42 | 332 | 48 | 458 | NT | NT | 22 | 314 | 43 | 550 | 0.61 |
| % Retention |  |  | 114.3 | 138.0 | N/A | N/A | 52.4 | 94.6 | 102.4 | 165.7 |  |

NT: Not Tested;
N/A: Not Applicable;
M: Melted;
TBTT: Too Brittle To Test (due to severe degradation)

TABLE 1

| Ingredients | Comp. Example 1 | Comp. Example 2 | Inventive Example |
| --- | --- | --- | --- |
| Aromatic Diisocyanate | MDI | MDI | MDI |
| Polyol | Polycarbonate diol | Polyether diol | Polycarbonate diol |
| Chain Extender | BDO | PSG | PSG |

[1] PSG 2,2'-(2,4,8,10-tetraoxaspiro[5,5]undecane-3,9-diyl)bis(2-methylpropan-1-ol)

The heat resistance of the TPUs in these examples is evaluated by using short term heat aging requirements of ISO 6722 Type D and UL1581 standards used in wire and cable industry. ISO 6722 Type D short term heat aging conditions as shown in Table 2 are 175° C./10 days and 200° C./6 hours. For UL1581, the short term heat aging conditions are shown in Table 3.

TABLE 2

| Class | Continuous operating temperature (3000 h) $T_u$° C. to $T_o$° C. | Short-term temperature (240 h) $(T_o + 25)$° C. | Temperature resulting in thermal damage (6 h) $(T_o + 50)$° C. |
| --- | --- | --- | --- |
| A | −40 to 85 | 110 ± 2 | 135 ± 3 |
| B | −40 to 100 | 125 ± 3 | 150 ± 3 |
| B (105) | −40 to 105 | 130 ± 3 | 155 ± 3 |
| C | −40 to 125 | 150 ± 3 | 175 ± 3 |
| D | −40 to 150 | 175 ± 3 | 200 ± 3 |

TABLE 3

| Temperature resistance rating (° C.) | 60 | 75 | 80 | 90 | 105 | 125 | 150 | 180 |
| --- | --- | --- | --- | --- | --- | --- | --- | --- |
| Test temperature (° C.) | 100 | 100 | 113 | 121 | 136 | 158 | 180 | 213 |
| Aging time (days) | 7 | 10 | 7 | 7 | 7 | 7 | 7 | 7 |

All molecular weight values provided herein are weight average molecular weights unless otherwise noted. All molecular weight values have been determined by GPC analysis unless otherwise noted.

As used herein, the transitional term "comprising", which is synonymous with "including", "containing", or "characterized by", is inclusive or open-ended and does not exclude additional, un-recited elements or method steps. However, in each recitation of "comprising" herein, it is intended that the term also encompass, as alternative embodiments, the phrases "consisting essentially of" and "consisting of", where "consisting of" excludes any element or step not specified and "consisting essentially of" permits the inclusion of additional un-recited elements or steps that do not materially affect the essential or basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A thermoplastic polyurethane (TPU) consisting of the reaction product of (1) an aromatic polyisocyanate, (2) an alkylene substituted spirocyclic compound comprising an alkylene substituted saturated spirocyclic-diol, an alkylene substituted saturated spirocyclic-diamine, or a combination thereof, and (3) a polycarbonate polyol, wherein the alkylene substituted spirocyclic compound is 2,2'-(2,4,8,10-tetraoxaspiro[5,5]undecane-3,9-diyl)bis(2-methylpropan-1-ol).

2. The thermoplastic polyurethane of claim 1 wherein the polycarbonate polyol is the reaction product of at least one alkylene carbonate and a cycloaliphatic or aliphatic diol.

3. The thermoplastic polyurethane of claim 1 wherein the polycarbonate polyol is selected from poly(heptamethylenecarbonate)diol, poly(hexamethylenecarbonate)diol, poly(pentamethylenecarbonate)diol, poly-(tetramethylenecarbonate)diol, poly(pentamethylene-co-hexamethylenecarbonate)diol or poly(tetramethylene-co-hexamethylenecarbonate)diol or combinations thereof.

4. A process of making a thermoplastic polyurethane (TPU) comprising the steps of: (I) providing a reaction mixture consisting of (1) an aromatic polyisocyanate, (2) an alkylene substituted spirocyclic compound comprising an alkylene substituted saturated spirocyclic-diol, an alkylene substituted saturated spirocyclic-diamine, or a combination thereof, and (3) a polycarbonate polyol;
    wherein the alkylene substituted spirocyclic compound is 2,2'-(2,4,8,10-tetraspiro[5,5]undecane-3,9-diyl)bis(2-methylpropan-1-ol).

5. An article comprising a thermoplastic polyurethane (TPU), according to claim 1.

6. A transfer element comprising a thermoplastic polyurethane (TPU), according to claim 1.

7. A cable or a wire coated with a thermoplastic polyurethane (TPU), according to claim 1.

8. A sealing system comprising a thermoplastic polyurethane (TPU), according to claim 1.

9. A fire retardant and thermal insulating fabric containing a thermoplastic polyurethane (TPU), according to claim 1.

10. A method of increasing the heat resistance of an article, comprising forming an article from a thermplastic polyurethane composition wherin the article comprises an effective amount of a thermoplastic polyurethane (TPU) wherein the TPU consists of the reaction product of (1) a polyisocyanate, (2) an alkylene substituted spirocyclic compound comprising an alkylene substituted saturated spirocyclic-diol, an alkylene substituted saturated spirocyclic-diamine, or a combination thereof, and (3) a polycarbonate polyol, wherein the alkylene substituted spirocyclic compound is 2,2'-(2,4,8,10-tetraoxaspiro[5,5]undecane-3,9-diyl)bis(2-methylpropan-1-ol).

* * * * *